(12) United States Patent
Jung

(10) Patent No.: US 7,632,214 B2
(45) Date of Patent: Dec. 15, 2009

(54) CONTROLLING METHOD FOR DAMPER CLUTCH OF AUTOMATIC TRANSMISSION AND SYSTEM THEREOF

(75) Inventor: Min Gyu Jung, Yongin (KR)

(73) Assignee: Hyundai Motor Company, Seoul (KR)

( * ) Notice: Subject to any disclaimer, the term of this patent is extended or adjusted under 35 U.S.C. 154(b) by 490 days.

(21) Appl. No.: 11/603,869

(22) Filed: Nov. 22, 2006

(65) Prior Publication Data

US 2008/0070751 A1 Mar. 20, 2008

(30) Foreign Application Priority Data

Sep. 14, 2006 (KR) ........................ 10-2006-0089192

(51) Int. Cl.
*F16H 61/14* (2006.01)
(52) U.S. Cl. .................... 477/168; 477/169; 477/174; 477/175
(58) Field of Classification Search .................. 477/168, 477/169, 174, 175
See application file for complete search history.

(56) References Cited

U.S. PATENT DOCUMENTS

| | | | | |
|---|---|---|---|---|
| 5,088,582 A | * | 2/1992 | Saitou et al. ................ | 477/169 |
| 5,792,024 A | * | 8/1998 | Yeo ............................. | 477/174 |
| 6,942,598 B2 | * | 9/2005 | Kondo et al. ................ | 477/169 |
| 7,361,120 B2 | * | 4/2008 | Iida et al. .................... | 477/65 |
| 7,530,924 B2 | * | 5/2009 | Brevick ...................... | 477/176 |
| 2005/0137059 A1 | * | 6/2005 | Takahashi ................... | 477/169 |
| 2008/0269013 A1 | * | 10/2008 | Minaki et al. ............... | 477/86 |

FOREIGN PATENT DOCUMENTS

KR 1020060001073 1/2006

* cited by examiner

*Primary Examiner*—Sherry Estremsky
(74) *Attorney, Agent, or Firm*—Morgan, Lewis & Bockius LLP

(57) ABSTRACT

A controlling method and system for a damper clutch of an automatic transmission control a damper clutch release condition according to a direct connection status of a damper clutch. The controlling method includes: determining whether the damper clutch is in a direct connection status in a power-on state or a direct connection status in a power-off state; detecting information of a vehicle if the damper clutch is in the direct connection status of the power-on or power-off state; determining whether a release condition of the damper clutch is satisfied; and releasing the damper clutch if the release condition of the damper clutch is satisfied.

9 Claims, 2 Drawing Sheets

FIG.3

| | No < 40 km/h | 40 < No < 80km/h | 80 < No < 100km/h | 100km/h < No |
|---|---|---|---|---|
| 3rd gear | 2.1 | 2.4 | 2.7 | 3.1 |
| 4th gear | 2.1 | 2.5 | 3.1 | 3.1 |
| 5th gear | 2.1 | 2.5 | 3.1 | 3.4 |

FIG.4

| | No < 40 km/h | 40 < No < 80km/h | 80 < No < 100km/h | 100km/h < No |
|---|---|---|---|---|
| 3rd gear | 1.7 | 1.7 | 1.7 | 1.7 |
| 4th gear | 1.7 | 1.7 | 1.7 | 1.7 |
| 5th gear | 1.7 | 2.0 | 2.0 | 2.0 |

CONTROLLING METHOD FOR DAMPER CLUTCH OF AUTOMATIC TRANSMISSION AND SYSTEM THEREOF

CROSS-REFERENCE TO RELATED APPLICATION

This application claims priority to and the benefit of Korean Patent Application No. 10-2006-0089192 filed in the Korean Intellectual Property Office on Sep. 14, 2006, the entire contents of which are incorporated herein by reference.

BACKGROUND OF THE INVENTION (a) Field of the Invention

The present invention relates to a controlling method and system for a damper clutch of an automatic transmission. More particularly, the present invention relates to a controlling method and system for a damper clutch that control a damper clutch release condition according to a direct connection status of a damper clutch.

(b) Description of the Related Art

A typical automatic transmission uses a torque converter with low efficiency, and thus, compared to a manual transmission, it has a critical drawback in fuel consumption. To overcome this drawback, a damper clutch that directly connects and releases a pump axis of a torque converter to a turbine has been provided. This prevents deterioration of fuel consumption due to power loss generated by a rotation-speed difference between the pump axis and the turbine axis above a predetermined vehicle speed.

The release condition of the damper clutch is determined by conditions such as an oil temperature, engine speed, vehicle speed, turbine speed, and variation of a throttle opening. Particularly, the variation of a throttle opening relates to a shock of the damper clutch. However, in a conventional control method of the damper clutch, the engagement or release has been determined by a variation of a throttle opening regardless of the direct connection status (i.e. direct connection status in a power-on state or a direct connection status in a power-off state). Consequently, the damper clutch might not be controlled according to various running states.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a controlling method and system for a damper clutch of an automatic transmission with decreased shock and improved drivability by controlling a damper clutch release condition according to a direct connection status of a damper clutch. In addition, the present invention stores a damper clutch release condition in a map table related with shift speed and vehicle speed, and controls the damper clutch according to the map.

An exemplary embodiment of the present invention provides a controlling system for a damper clutch of an automatic transmission, including: a shift speed detector; a vehicle speed detector; a throttle opening detector; a transmission control unit for receiving information about the shift speed, the vehicle speed, and the variation of the throttle opening from the detectors and generating a damper clutch control signal corresponding to the information; and an actuator for generating a pressure for controlling the damper clutch based on the control signal of the transmission control unit.

The transmission control unit can be programmed to perform a controlling method for a damper clutch of an automatic transmission according to another exemplary embodiment of the present invention as described below.

Another embodiment of the present invention provides a controlling method for a damper clutch of an automatic transmission, including: determining whether a damper clutch is directly connected to a torque converter in a power-on state or in a power-off state; detecting driving information of a vehicle if the damper clutch is directly connected to the torque converter in the power-on state or in the power-off state; determining whether a release condition of the damper clutch is satisfied; and releasing the damper clutch if the release condition of the damper clutch is satisfied.

The release condition of the damper clutch can be different for the power-on state and the power-off state.

The release condition of the damper clutch can be satisfied when a variation of a throttle opening is larger than or equal to a predetermined value.

The predetermined value can be stored in a map table related to a shift speed and a vehicle speed.

The driving information can include a shift speed, a vehicle speed, and a variation of a throttle opening.

BRIEF DESCRIPTION OF THE DRAWINGS

FIG. 3 is an example of a map table for showing a release condition where a damper clutch is directly connected to a torque converter in a power-on state in a controlling method for a damper clutch of an automatic transmission according to an exemplary embodiment of the present invention.

FIG. 4 is an example of a map table for showing a release condition where a damper clutch is directly connected to a torque converter in a power-off state in a controlling method for a damper clutch of an automatic transmission according to an exemplary embodiment of the present invention.

DETAILED DESCRIPTION OF THE PREFERRED EMBODIMENTS

Exemplary embodiments of the present invention will hereinafter be described in detail with reference to the accompanying drawings.

Figure 1:
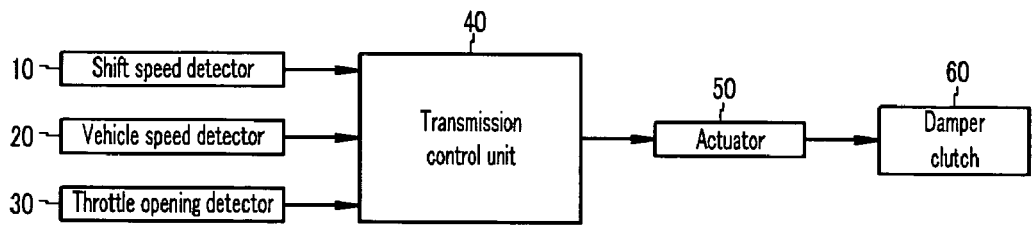
FIG. 1 is a block diagram of a controlling system for a damper clutch of an automatic transmission according to an exemplary embodiment of the present invention.

Referring to FIG. 1, a controlling system for a damper clutch 60 of an automatic transmission according to an exemplary embodiment of the present invention includes a shift speed detector 10, a vehicle speed detector 20, a throttle opening detector 30, a transmission control unit 40, and an actuator 50.

The shift speed detector 10 detects a synchronized shift speed and provides the information of the shift speed to the transmission control unit 40.

The vehicle speed detector 20 includes a vehicle speed sensor that is provided to a transmission output shaft. The vehicle speed detector 20 calculates a vehicle speed from an output shaft rotation speed and provides the information of the vehicle speed to the transmission control unit 40.

The throttle opening detector 30 detects a throttle opening depending on an operation of an accelerator pedal, and provides the information of the throttle opening to the transmission control unit 40.

The transmission control unit 40 may include at least one processor activated by a program that performs each step of a controlling method according to the present invention. The transmission control unit 40 may further include a memory and associated hardware, software, and/or firmware as may be selected and programmed by a person of ordinary skill in the art based on the teachings herein.

The transmission control unit 40 calculates a variation of throttle opening using the information of the opening degree of the throttle and compares the variation of throttle opening to a predetermined value. If the variation of throttle opening is larger than or equal to the predetermined value, the transmission control unit 40 generates a release signal of a damper clutch 60. If the variation of throttle opening is smaller than the predetermined value, the transmission control unit 40 generates a signal to maintain an engaged state of the damper clutch 60.

The predetermined value may vary with shift speed and vehicle speed, and may be stored in a map table in the transmission control unit 40. As shown in FIG. 3 and FIG. 4, two separate map tables may be stored in the transmission control unit 40: one for the power-on state and one for the power-off state.

The actuator 50 receives a control signal from the transmission control unit 40 and controls the operation of the damper clutch 60.

Figure 2:
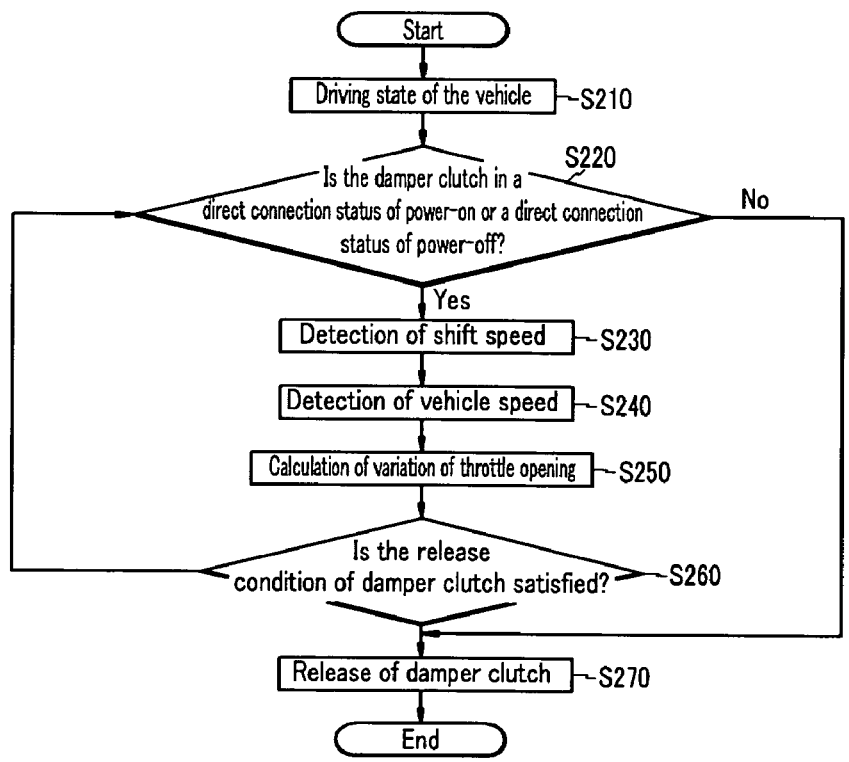
FIG. 2, is a flowchart of a controlling method for a damper clutch of an automatic transmission according to an exemplary embodiment of the present invention.

Referring to FIG. 2, during a driving state of the vehicle in step S210, the transmission control unit 40 determines whether the damper clutch 60 is directly connected to the torque converter in the power-on state or in the power-off state in step S220.

If the damper clutch 60 is not directly connected, the transmission control unit 40 finishes the controlling method for a damper clutch of an automatic transmission consistent with the present invention.

If the damper clutch 60 is directly connected in the power-on state or in the power-off state, the shift speed detector 10 detects the synchronized shift speed in step S230. The vehicle speed detector 20 detects the vehicle speed in step S240, and the throttle opening detector 30 detects the opening degree of the throttle.

The transmission control unit 40 receives the information of the shift speed, the vehicle speed, and the opening degree of the throttle from the respective detectors 10, 20, and 30, and calculates a variation of throttle opening using the information of the opening degree of the throttle in step S250.

The transmission control unit 40 then determines whether the release condition of the damper clutch 60 is satisfied in step S260.

The release condition of the damper clutch 60 may be that the variation of throttle opening is larger than or equal to a predetermined value. The predetermined value may vary with shift speed and vehicle speed, and can be selected by a person of ordinary skill in the art based on the teachings herein. In exemplary embodiments, the predetermined value is stored in two map tables: one for power-on and one for power-off.

If the release condition of the damper clutch 60 is not satisfied in step S260, the transmission control unit 40 returns to step S220.

If the release condition of the damper clutch 60 is satisfied in the step S260, the transmission control unit 40 activates the actuator 50 and releases the damper clutch 60.

According to exemplary embodiment of the present invention, the generation of shock can be reduced and the drivability can be improved by controlling a damper clutch release condition according to a direct connection status (i.e. power-on or power-off) of a damper clutch.

In addition, the generation of shock can be reduced and the drivability can be improved by storing a damper clutch release condition in a map table based on shift speed and vehicle speed, and controlling the damper clutch according to the map table.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A controlling method for a damper clutch of an automatic transmission, comprising:
   determining whether the damper clutch is directly connected to a torque converter in a power-on state or in a power-off state;
   detecting information if the damper clutch is directly connected to the torque converter in the power-on state or in the power-off state;
   determining whether a release condition of the damper clutch is satisfied; and
   releasing the damper clutch if the release condition of the damper clutch is satisfied,
   wherein the release condition of the damper clutch comprises a first release condition for the power-on state and a second release condition for th power-off state.

2. The method of claim 1, wherein the release condition of the damper clutch is satisfied if a variation of a throttle opening is larger than or equal to a predetermined value.

3. The method of claim 2, wherein the predetermined value varies with a shift speed and a vehicle speed.

4. The method of claim 1, wherein the information comprises a shift speed, a vehicle speed, and a variation of a throttle opening.

5. A controlling system for a damper clutch of an automatic transmission, comprising:
   a shift speed detector for detecting a shift speed of a vehicle;
   a vehicle speed detector for detecting a vehicle speed of a vehicle;
   a throttle opening detector for detecting an opening degree of a throttle;
   a transmission control unit for receiving information about the shift speed, the vehicle speed, and the variation of the throttle opening, and for generating a damper clutch control signal corresponding to the information; and
   an actuator for controlling the damper clutch according to the control signal,
   wherein the transmission control unit is programmed to perform a controlling method comprising:
      determining whether the damper clutch is directly connected to a torque converter in a power-on state or in a power-off state,
      detecting the information if the damper clutch is directly connected to the torque converter in the power-on state or in the power-off state,
      determining whether a release condition of the damper clutch is satisfied, and
      releasing the damper clutch if the release condition of the damper clutch is satisfied.

6. The system of claim 5, wherein the release condition of the damper clutch comprises a first release condition for the power-on state and a second release condition for the power-off state.

7. The system of claim 5, wherein the release condition of the damper clutch is satisfied if a variation of a throttle opening is larger than or equal to a predetermined value.

8. The system of claim 7, wherein the predetermined value varies with a shift speed and a vehicle speed.

9. The system of claim 5, wherein the information comprises a shift speed, a vehicle speed, and a variation of a throttle opening.

* * * * *